United States Patent Office 3,480,369
Patented Nov. 25, 1969

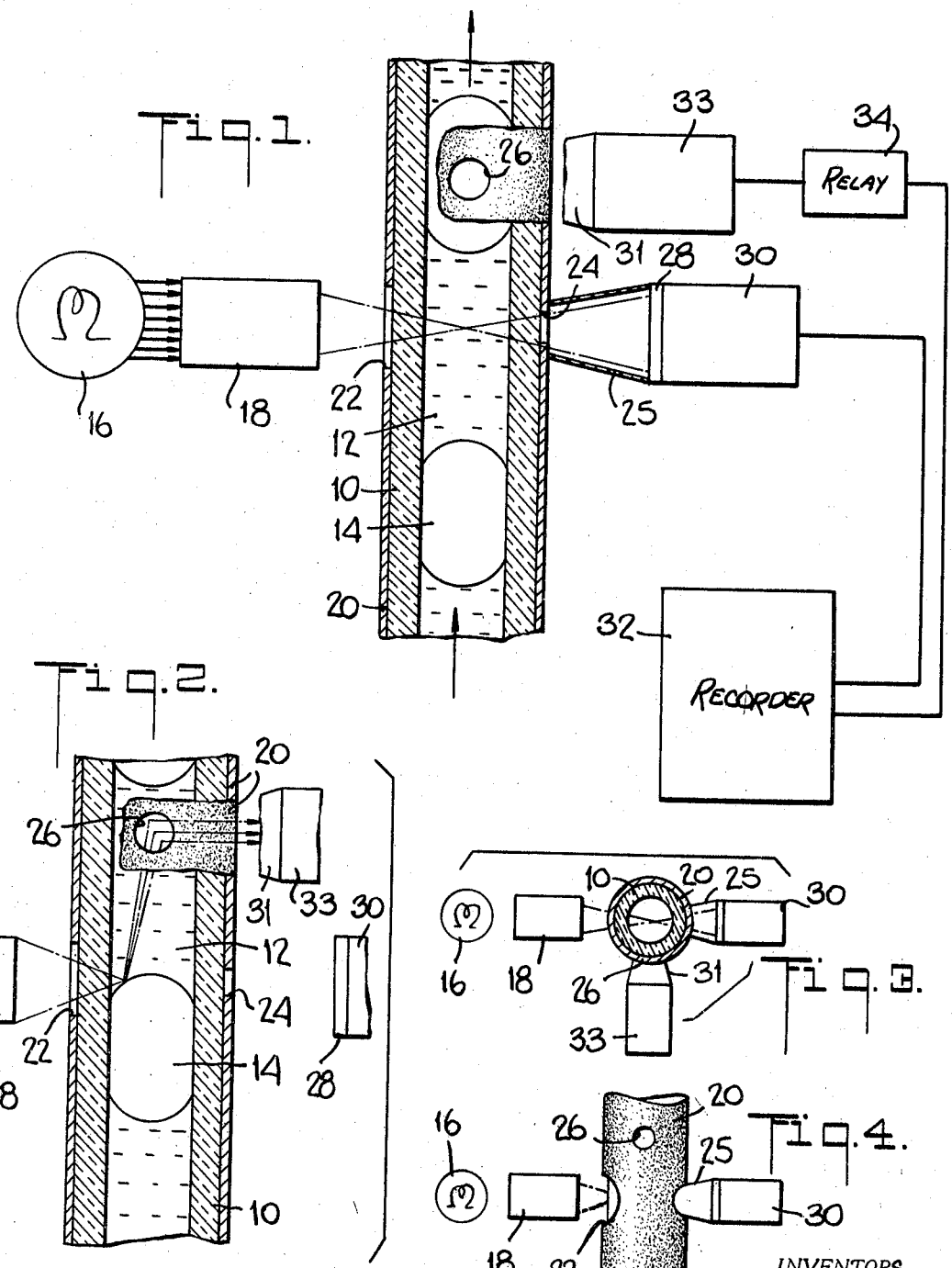

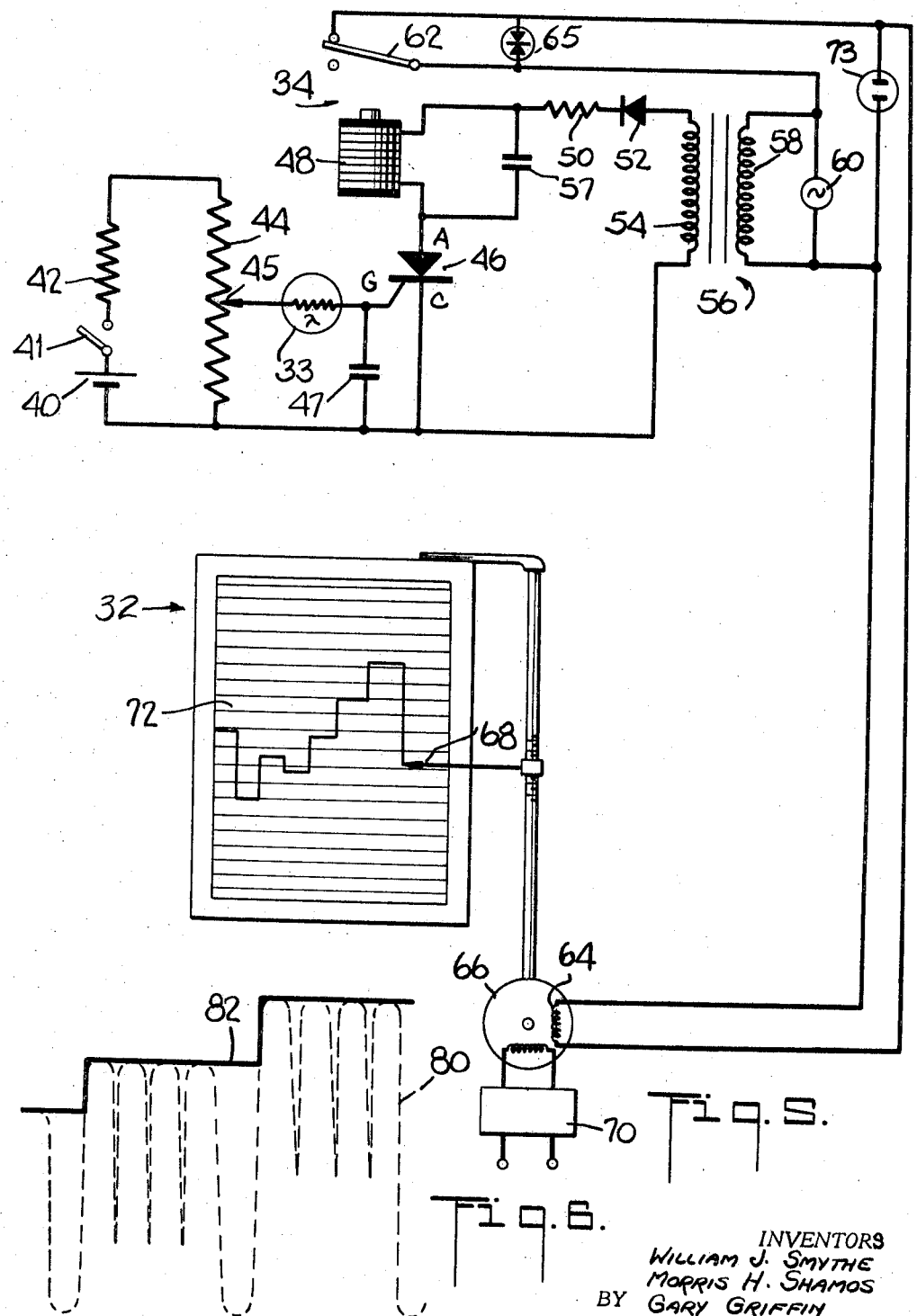

3,480,369
METHOD AND APPARATUS FOR THE COLORIMETRIC ANALYSIS OF LIQUID SAMPLES
William J. Smythe, Rye, Morris H. Shamos, New York, and Gary A. Griffin, Yonkers, N.Y., assignors to Technion Corporation, a corporation of New York
Filed Feb. 21, 1966, Ser. No. 528,748
Int. Cl. G01n 21/26
U.S. Cl. 356—201                                 6 Claims

ABSTRACT OF THE DISCLOSURE

Method and apparatus are described for the colorimetric analysis of a plurality of liquid samples flowing through a flow cell as a continuous stream which is segmentized by gas segments. The stylus traversal mechanism of a recorder associated with the flow cell is deactivated while each gas segment intercepts the measuring light beam through the flow cell.

---

This invention relates to automatic, continuous flow, wet chemistry, analysis apparatus; and more particularly to a flow cell and recorder system for the analysis of a plurality of sample segments flowing in a stream and interspersed with gas segments.

In the automatic analysis of liquids, such as is taught in U.S. Patent No. 2,797,149 issued to Leonard T. Skeggs on June 25, 1959, a liquid stream consisting of a seriatim flow of unique liquid sample segments spaced apart by gas segments and including intermediate gas segments is treated by a continuous flow of suitable reagents, and otherwise suitably further treated, to the result that a color reaction is produced in the sample, the optical density of which at a given wave length bears a predetermined relationship to the content of an ingredient in the original sample. The colored samples in a flowing stream are passed through a flow cell which is in the path of a measuring light beam of known wave length and intensity, and any change in the light beam is measured by a detector and is recorded to provide a positive measurement of the content of the ingredient of interest in the original sample. It may be noted that the gas segments serve to scrub the interior of the conduits of the system to minimize contamination between samples.

The recording is customarily done on a chart recorder having a stylus which follows a signal provided by the detector of the measuring light beam. When a gas segment intersects the measuring light beam the light transmittance measured by the detector falls sharply, causing a relatively violent excursion of the stylus, which is not advantageous.

In the U.S. patent application Ser. No. 369,695 of William J. Smythe et al., filed May 25, 1964 and assigned to a common assignee, it was proposed, inter alia, to mechanically disconnect the signal from the detector to the recorder by means of the sample supply linkage, when a sample is not flowing through the flow cell. Such an arrangement requires careful phasing of the sample supply linkage to the flow cell and requires a safety margin with respect to the liquid-gas interfaces to ensure a timely disconnection; and thus is not very efficient with respect to the intermediate, smaller, gas segments within each sample.

Accordingly, it is an object of this invention to provide a method, and an apparatus therefor, for deactivating the traversal of the stylus whenever a gas segment commences to intersect the measuring light beam through the flow cell, and for reactivating the traversal when such a gas segment withdraws from the light beam.

A feature of this invention is the provision of a method, and an apparatus therefor, of detecting the arrival of the leading meniscus of a gas segment as it commences to intersect the measuring light beam, and in response thereto deactivating the stylus traversing mechanism of the recorder, and maintaining the stylus deactivated until the departure of the trailing menicus of the gas segment from the measuring light beam is detected.

These and other objects, features and advantages of this invention will become apparent upon consideration of the following specification taken in conjunction with the accompanying drawings in which:

FIG. 1 is a schematic diagram illustrating an embodiment of this invention;

FIG. 2 is a detail of FIG. 1 further illustrating the embodiment of FIG. 1;

FIG. 3 is a cross-section of a detail of FIG. 1 showing the location of an auxilary light detector;

FIG. 4 is a detail elevation of FIG. 1 showing the location of the auxilary light detector;

FIG. 5 is a schematic diagram of a recorder deactuation circuit ebodying this invention; and FIG. 6 is an illustration of the chart recording provided by this invention.

Turning to the drawings, a vertical, tubular, flow cell 10 has a stream of alternate liquid 12 and gas 14 segments flowing upwardly therethrough. The stream may be provided by a sample supply device such as is shown in U.S. Patent No. 3,038,340 issued to Jack Isreeli on June 12, 1962, coupled to a pump such as is shown in U.S. Patent No. 2,935,028 issued to Andres Ferrari, Jr., et al. on May 3, 1960.

A light source 16 is disposed at the left side of the cell 10, and a condenser 18 serves to focus the light therefrom into the cell. A light shield 20 is disposed about the flow cell and has three holes 22, 24 and 26 therein. The large hole 22 passes the light beam from the condenser into the flow cell and the hole 24 passes the light beam from the flow cell through a light tight fitting 25 through an interference filter 28 to a light detector 30. The output signal from the light detector 30 is coupled to a chart recorder 32 having a stylus, such as is shown in U.S. Patent No. 3,031,917 issued to Milton H. Pelavin on May 1, 1962. The hole 26 is shown as being closely spaced above the axis of the holes 22 and 24. An auxiliary light detector 33 is disposed by a light tight fitting 31 at the hole 26 to receive light therethrough.

When a liquid sample is flowing through the flow cell 10 and intersecting the light beam on the measuring axis from the condenser 18 to the primary detector 30, the primary detector receives most of the light from the condenser, less such light as is absorbed by the liquid sample and such small portion of light as is trapped in the column of liquid and the wall of the flow cell. As the leading meniscus of an upward flowing gas segment commences to intersect the light beam, it causes a major portion of the light beam to be reflected upwardly at a sharp angle, as shown in FIG. 2. The angle is sharp enough so that a considerable portion of the light passes into the wall of the flow cell and is captured therein. If one observes this, the glass tube forming the flow cell appears to "light up." The same phenomenon occurs as the trailing meniscus of the gas segment intersects the light beam. After the leading meniscus has passed the measuring axis, but before the trailing meniscus has passed the measuring axis, more light enters the wall of the flow cell than when a liquid segment intersects the measuring axis.

Thus, it will be apparent that more light will pass from the wall of the flow cell through the hole 26 to the auxiliary detector 33 when a gas segment intersects the light beam on the measuring axis than when a liquid segment intersects the light beam. The auxiliary detector 33 is coupled to a relay 34 to deactuate or actuate the stylus traversing mechanism of the recorder 32 depending on whether or not, respectively, a gas segment intersects the measuring axis.

The auxiliary detector is advantageously located on or near the same transverse plane as the measuring axis, but with its light acceptance angle not on the measuring axis, so as to receive a maximum intensity of reflected light from the wall of the flow cell. The auxiliary detector is not on the same plane, but rather a small distance along the longitudinal axis of the flow cell from the measuring axis, as shown in the drawing, this distance being advantageously less than the length of the smallest liquid segment to be measured, to avoid a gas segment phasing difficulty. As previously noted, there is always some light captured in the column of liquid, and each gas segment is effective to reflect some of this light into the adjacent wall of the flow cell, thereby providing a localized area of higher than ambient light intensity, which might be adequate to cause an auxiliary detector, if located thereadjacent, to energize the relay. In such an event, the relay would respond to both a gas segment intersecting the measuring axis, and an adjacent gas segment.

As shown in FIG. 5, an exemplary auxiliary detector 33 is of the resistance type and has a resistance which varies from 25,000 to 500,000 ohms when a liquid segment is in the light path, to less than 100 ohms when the leading meniscus of a gas segment intersects the light beam. The resistance detector 33 is provided with a current source comprising a battery 40, a switch 41, a fixed resistor 42, and a potentiometer 44, all in series. One terminal of the detector 33 is connected to the movable tap 45 of the potentiometer, and the other terminal is connected to the control element of a silicon controlled rectifier 46. A capacitor 47 is coupled between the control element and the cathode of the silicon controlled rectifier. The anode and cathode of the silicon controlled rectifier, the coil 48 of the relay 34, a resistor 50, a rectifier 52, the secondary winding 54 of a power transformer 56, are all in series, with a capacitor 57 in parallel with the coil 48. The primary winding 58 of the transformer is coupled to a suitable source of A.C. voltage 60. The normally closed contact 62 of the relay is in series with the input to the reference winding 64 of a two phase motor 66. An arc suppressor 65 is connected across the contact 62. The motor 66 drives the stylus 68 of the recorder 32 as shown in U.S. Patent No. 3,031,917, supra, in response to signals received from the detector 30 and amplified by an amplifier 70. The strip chart 72 of the recorder is continuously advanced by a chart drive, not shown. A neon light 73 is energized when the contact 62 is closed. When a liquid sample intersects the light beam, little light passes to the auxiliary detector 33 through the wall of the flow cell and its resistance is high, effectively open circuiting the silicon controlled rectifier and thereby deenergizing the relay coil. The relay contact is closed and the signal from the primary detector 30 is coupled to the stylus driving motor 66. The stylus is traversed in response to the signal from the primary detector. When a gas segment intersects the light beam, much more light passes to the auxiliary detector 33 through the wall of the flow cell and its resistance is low, effectively short circuiting the silicon controlled rectifier and energizing the coil of the relay. The relay contacts 62 are opened, opening the reference circuit to the signal winding 64, and precluding rotation of the motor 66. The stylus remains stationary at its pre-existing excursion until the gas segment leaves the light beam. It is desirable to open the reference winding rather than the signal winding, since if the signal winding were opened, the unloaded amplifier 70 might drift.

In FIG. 6, the curve 80 normally traced by the stylus of the recorder of U.S. Patent No. 3,031,917, supra, in the presence of gas segments, is shown in dotted line; the curve 82 traced by the stylus having an auxiliary detector according to this invention is shown in solid line.

Advantageously, a sampler such as is shown in U.S. Patent No. 3,134,263, issued May 26, 1964 to Edward B. M. DeJong, or in U.S. Patent 3,230,776, issued Jan. 25, 1966 to Jack Isreeli et al., may be utilized to supply segments of wash liquid intermediate each liquid sample. Such wash liquid segments serve to cleanse the conduits and will serve to provide a relatively low constituent concentration signal from the light detector to the recorder. This signal, when recorded, will provide a readily apparent demarcation between immediately successive samples having identical light transmittance values.

While there has been shown and described a preferred embodiment of this invention, it will be appreciated that other embodiments will become apparent to those skilled in the art upon the reading of this disclosure, and, therefore, the invention is not to be limited by this disclosure except as is required by the appended hereto claims.

What is claimed is:

1. A method precluding the traversal of the stylus of a chart recorder by a stylus traversing mechanism in response to a passage of gas segment through the flow cell of an automatic analysis apparatus for measuring liquid segments, said method comprising: passing a continuous stream of alternate gas and liquid segments through a flow cell; continuously directing a light beam through the flow cell along a measuring axis for the measurement of liquid segments; detecting the light beam passing through the flow cell and along the measuring axis for measurement of the liquid segments; controlling the stylus traversing mechanism in accordance with the light detected along said measuring axis; and further detecting the arrival at and departure from the measuring axis of the leading and trailing menisucses, respectively, of each gas segment by detecting the light reflected within said flow cell at a point other than along said measuring axis due to the passage of a gas segment along the measuring axis and, in response to said further detection, deactivating the stylus traversing mechanism during passage of a gas segment along the measuring axis.

2. A method according to claim 1 where said further detection is achieved by detecting light reflected within said flow cell and at a distance along the longitudinal axis of the flow cell removed from the measuring axis, the distance being less than the length of the liquid segment to be measured.

3. An automatic analysis apparatus for liquids comprising: a flow cell; a stream of alternate gas and liquid segments flowing through said flow cell; a light source for passing a beam of light along a measuring axis through said flow cell; a light detector means for receiving and measuring the intensity of the beam of light passing through said flow cell and for providing a signal indicative of said intensity; a recorder having a stylus and means coupled to said light detector means for traversing said stylus in response to said signal; and an auxiliary light detector means disposed adjacent to said flow cell for detecting the arrival at and departure from the measuring axis of the leading and trailing meniscuses, respectively, of each gas segment flowing through said flow cell; and means responsive to said auxiliary means for deactivating said traversing means while a gas segment intercepts said measuring axis.

4. Apparatus according to claim 3 wherein said auxiliary light detector means is a resistance type photocell in circuit with the actuating means of a relay whose contacts are in circuit with said stylus traversing means.

5. Apparatus according to claim 3 wherein said auxiliary light detector means is disposed along the longitudinal axis of the flow cell with its light acceptance angle off the measuring axis.

6. Apparatus according to claim 3 wherein said auxiliary light detector means is disposed a distance along the longitudinal axis of said flow cell away from said measuring axis which is less than the length of the liquid segments.

References Cited

UNITED STATES PATENTS

| | | |
|---|---|---|
| 2,982,170 | 5/1961 | Wyss. |
| 3,031,917 | 5/1962 | Pelavin. |
| 3,134,263 | 5/1964 | DeJong. |
| 3,344,702 | 10/1967 | Wood et al. _____ 250—206 X |
| 3,117,233 | 1/1964 | Mittelberger et al. |

JEWELL H. PEDERSEN, Primary Examiner

R. J. WEBSTER, Assistant Examiner

U.S. Cl. X.R.

23—230, 253; 250—218, 220; 346—33; 356—246